(12) United States Patent
Sandberg (10) Patent No.: US 11,643,023 B2
(45) Date of Patent: May 9, 2023

(54) TECHNIQUES FOR PROVIDING A SENSOR GUARD

(71) Applicant: Volvo Car Corporation, Gothenburg (SE)

(72) Inventor: Anders Sandberg, Sävedalen (SE)

(73) Assignee: Volvo Car Corporation, Gothenburg (SE)

( * ) Notice: Subject to any disclaimer, the term of this patent is extended or adjusted under 35 U.S.C. 154(b) by 644 days.

(21) Appl. No.: 16/693,437

(22) Filed: Nov. 25, 2019

(65) Prior Publication Data

US 2020/0164813 A1    May 28, 2020

(30) Foreign Application Priority Data

Nov. 26, 2018  (EP) ..................................... 18208320

(51) Int. Cl.
| | |
|---|---|
| *B60R 11/04* | (2006.01) |
| *B60S 1/56* | (2006.01) |
| *H04N 5/225* | (2006.01) |
| *B60R 11/00* | (2006.01) |

(52) U.S. Cl.
CPC .............. *B60R 11/04* (2013.01); *B60S 1/566* (2013.01); *H04N 5/2252* (2013.01); *B60R 2011/0094* (2013.01)

(58) Field of Classification Search
USPC ........................................................ 15/250
See application file for complete search history.

(56) References Cited

U.S. PATENT DOCUMENTS

| | | | |
|---|---|---|---|
| 6,944,908 | B2 | 9/2005 | Hoetzer et al. |
| 9,880,382 | B1 | 1/2018 | Tippy et al. |
| 2017/0131139 | A1 | 5/2017 | Park et al. |
| 2017/0244873 | A1 | 8/2017 | Izabel et al. |
| 2017/0313288 | A1* | 11/2017 | Tippy ................... B60R 1/0602 |

FOREIGN PATENT DOCUMENTS

| | | | | |
|---|---|---|---|---|
| DE | 102004011091 A1 * | 9/2005 | ................ | B60S 1/56 |
| DE | 102004011091 A1 | 9/2005 | | |
| DE | 102005021670 A1 | 11/2006 | | |
| DE | 102012015950 B3 * | 1/2014 | ............. | B60R 11/04 |

(Continued)

OTHER PUBLICATIONS

May 24, 2019 European Search Report issue on International Application No. EP18208320.

(Continued)

*Primary Examiner* — Behrooz M Senfi
(74) *Attorney, Agent, or Firm* — Clements Bernard Walker; Christopher L. Bernard (57) ABSTRACT

A sensor guard, for protecting a sensor of a vehicle. The sensor guard comprises a blade movable to sweep through a line-of-sight of the sensor when the sensor is arranged to be protected by the sensor guard, an extension of the blade in a direction parallel to the line-of-sight when the blade sweeps through the line-of sight being greater than an extension of the blade in a direction of movement of the blade when the blade sweeps through the line-of sight; and an actuator arranged and configured to move the blade to repeatedly sweep through the line-of-sight of the sensor when the sensor is arranged to be protected by the sensor guard.

14 Claims, 5 Drawing Sheets

(56) References Cited

FOREIGN PATENT DOCUMENTS

| DE | 2014004172 A1 | | 9/2014 | |
|---|---|---|---|---|
| DE | 2014213283 A1 | | 1/2016 | |
| DE | 102014220257 A1 | * | 4/2016 | ............... B60S 1/56 |
| EP | 3014353 A1 | | 5/2016 | |
| FR | 2744252 A1 | * | 8/1997 | ............. B23P 15/24 |
| WO | 2014206612 A1 | | 12/2014 | |
| WO | 2015003705 A1 | | 1/2015 | |
| WO | 2018130610 A1 | | 7/2018 | |

OTHER PUBLICATIONS

Oct. 12, 2022 Office Action issued in the corresponding CN application No. 201911153202.9.

\* cited by examiner

TECHNIQUES FOR PROVIDING A SENSOR GUARD

CROSS-REFERENCE TO RELATED APPLICATION

The present disclosure claims the benefit of priority of co-pending European Patent Application No. 18208320.4, filed on Nov. 26, 2018, and entitled "TECHNIQUES FOR PROVIDING A SENSOR GUARD," the contents of which are incorporated in full by reference herein.

TECHNICAL FIELD

The present invention relates to a sensor guard, for protecting a sensor of a vehicle from contamination and damage, to a sensing system, and to a vehicle.

BACKGROUND

Currently, much effort is spent on the development of sophisticated driver assistance systems, semi-autonomous, and even fully autonomous vehicles. Such systems and vehicles require various sensors to supplement, or replace, the driver's senses. To ensure safe operation, it is important that information from the sensors can be relied upon at all times. Accordingly, there is a need to deal with potential issues, such as contamination and damage resulting from the driving environment of the vehicle.

Sensors (such as radars and cameras) that are placed inside the windscreen are protected by the windscreen. But sensors placed elsewhere need other means for protection.

SUMMARY

In view of, it is an object of the present invention to provide for improved sensor guarding in a vehicle, of sensors not protected by the windscreen.

According to a first aspect of the present invention, it is therefore provided a sensor guard, for protecting a sensor of a vehicle, where the sensor guard includes a blade operable to sweep, under the control of an actuator, through a line-of-sight of the sensor when the sensor is arranged to be protected by the sensor guard, and where an extension of the blade in a direction parallel to the line-of-sight when the blade sweeps through the line-of sight is greater than an extension of the blade in a direction of movement of the blade when the blade sweeps through the line-of sight.

According to a second aspect of the present invention, it is provided a method of protecting a sensor of a vehicle using a sensor guard comprising at least one blade and an actuator arranged and configured to move the at least one blade to sweep through the line-of-sight of the sensor. The method comprises the steps of: acquiring a signal indicative of a speed of the vehicle; and controlling the actuator to move the at least one blade sufficiently fast to fulfill the following relation:

$L \times S > v$, where

L=the extension of the blade in the direction parallel to the line-of-sight when the blade sweeps through the line-of sight;

S=the number of sweeps through the line-of-sight by a blade per second; and v=the speed of the vehicle.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

Figure 1:
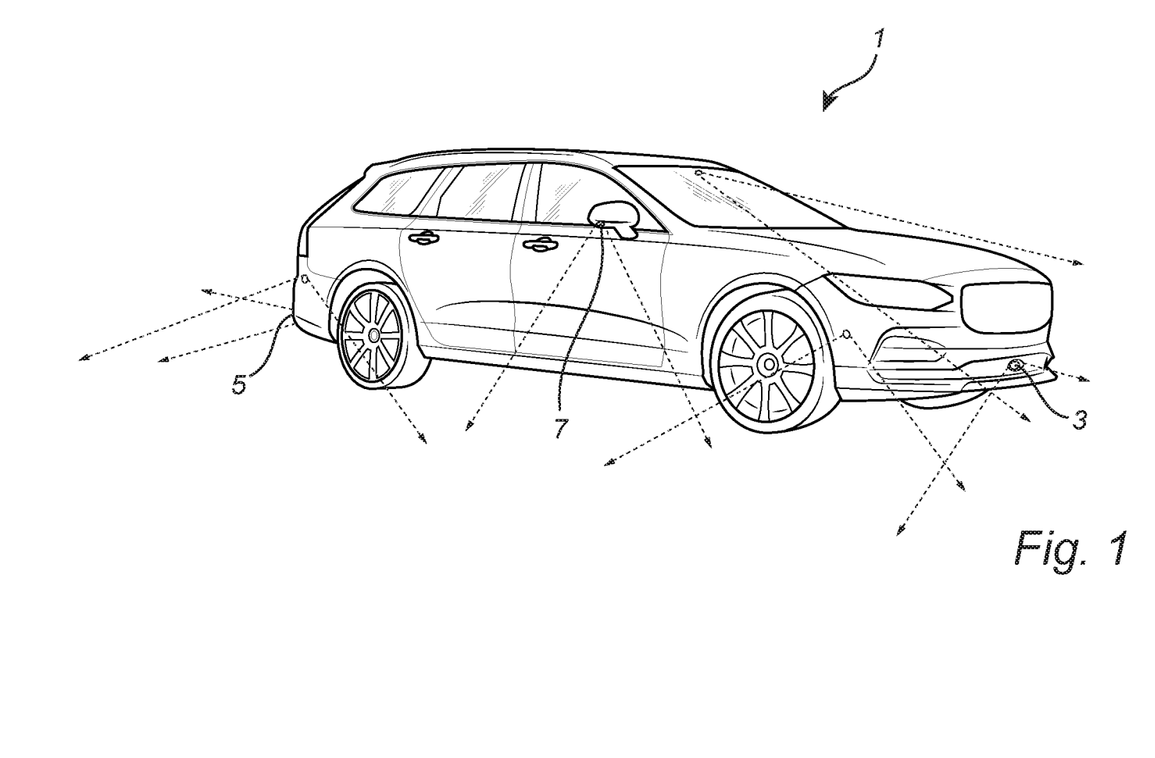
FIG. 1 schematically shows a vehicle according to an example embodiment of the present invention.

FIG. 1 schematically shows a vehicle, here in the form of a car 1, according to an example embodiment of the present invention. As is indicated in FIG. 1, the vehicle 1 comprises a plurality of sensing systems. These sensing systems may include various types of sensors with different requirements in respect of guarding. One representative sensor 3, which may require protection from contamination and damage, may be a front view optical sensor (such as a camera). It should, however, be noted that the sensor guard according to embodiments of the present invention may be useful for protecting many different kinds of sensors, which may be arranged in many different locations in or on the vehicle 1. Examples of such sensors may include a reverse camera 5, a rearview mirror camera 7, and various other types of sensors sensing electromagnetic radiation (for example light or radar signals), or acoustic signals etc.

The present invention is based on the realization that a blade moving sideways in front of a sensor can effectively hit and deflect incoming water droplets and other particles that would otherwise reach the sensor and potentially degrade the performance of the sensor. In particular, the present inventor has realized that this way of guarding a sensor can be more reliable and energy-efficient than to attempt to stop or deflect incoming particles by generating an air stream as is described in DE 10 2005 021 670, where a ventilator is arranged in front of a camera to create an airstream directed away from the camera to prevent particles from reaching the camera.

Especially relatively heavy particles, such as small stones, appear difficult to prevent from reaching the camera using the ventilator of DE 10 2005 021 670, even if the ventilator is operated at very high speed.

Compared to the ventilator in DE 10 2005 021 670, the sensor guard according to embodiments of the present invention described herein may require a considerably slower blade movement to protect the sensor. This may, for example, provide for less noise generated by the sensor guard. Also the mass or density of the incoming particles has no effect on the ability of the sensor guard according to embodiments of the present invention to protect the sensor.

In the following, various embodiments of the present invention will be described. All of these embodiments rely on the above realization and provide the same or similar advantageous effects.

Figure 2A:
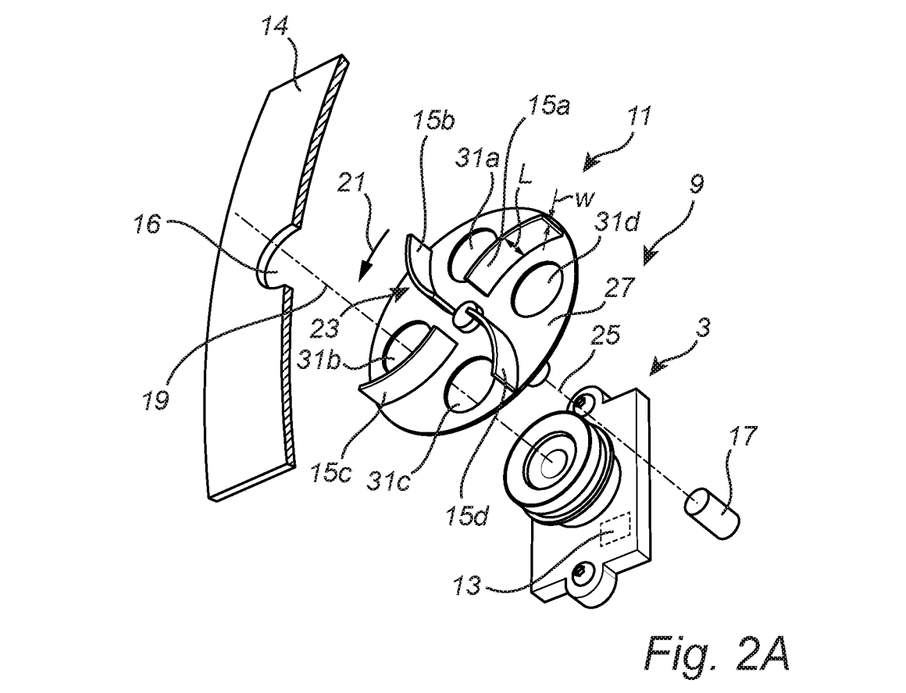
FIG. 2A is a schematic exploded perspective view of a sensing system comprising a sensor guard according to a first example embodiment of the present invention.

FIG. 2A is a schematic exploded perspective view of a sensing system comprising a sensor guard according to a first example embodiment of the present invention.

Referring to FIG. 2A, the sensing system 9 comprises a sensor, here exemplified by the above-mentioned front-view camera 3, a sensor guard 11 according to a first embodiment of the present invention, and a sensing system controller 13 configured to control operation of the sensor 3. The sensing system 9 is here indicated as being mounted behind a body panel 14 of the vehicle 1 with an aperture 16 to allow the sensor 3 to "see" the road ahead of the vehicle 1.

As is schematically indicated in FIG. 2A, the sensor guard 11 comprises a plurality of blades 15a-d operable to sweep under the control of an actuator, here in the form of an electric motor 17. The actuator 17 is arranged and configured to move the blades 15a-d to repeatedly sweep through the line-of-sight 19 of the sensor 3. Although not specifically indicated in FIG. 2A, the sensor guard 11 may comprise an actuator controller configured to control the actuator to move the blades 15a-d. According to embodiments of the invention, the actuator controller may be embodied by the above-mentioned sensing system controller 13.

Each of the blades 15a-d is movable to sweep through the line-of-sight 19 of the sensor 3 when the sensor 3 is arranged to be protected by the sensor guard 11. Furthermore, each of the blades 15a-d has a first extension L in a direction parallel to the line-of-sight 19, and a second extension w in a direction of movement, indicated by arrow 21. As can be seen in FIG. 2A, the first extension L is greater than the second extension w. For example, the first extension L may be at least five times greater than the second extension w.

In the first embodiment of the sensor guard 9 shown in FIG. 2A, each of the blades 15a-d exhibits a convex side 23 facing forward in the direction of movement of the blade 15a-d when the blade 15a-d sweeps through the line-of-sight 19 of the sensor 3. It should, however, be noted that the blades 15a-d need not necessarily be convex, and that many other blade configurations fall within the scope defined by the claims.

As is also shown in FIG. 2A, the blades 15a-d are rotatable around a rotational axis 25 substantially parallel to the line-of-sight 19. Further, the sensor guard 11 comprises a disc 27 arranged between the blades 15a-d and the sensor 3. In particular, the disc 27 may be joined to the blades 15a-d, and connected to a shaft of the motor 17, as is schematically indicated in FIG. 2A.

In the first embodiment in FIG. 2A, the disc 27 has a plurality of apertures 31a-d, arranged to allow the sensor 3 to sense through the apertures 31a-d when the disc 27 rotates around the rotational axis 25.

The blades 15a-d and the disc 27 may be manufactured in a single piece, for example by injection molding. Alternatively, the blades 15a-d and the disc 27 may be manufactured separately, and then joined together. In this case, the blades 15a-d and the disc 27 may be made of the same or different materials, depending on the functional requirements of the blades 15a-d and the disc 27, respectively. For instance, the disc 27 may be made of a transparent material, such as polycarbonate or glass, and the blades 15a-d may be made of another plastic material or metal.

Figure 2B:
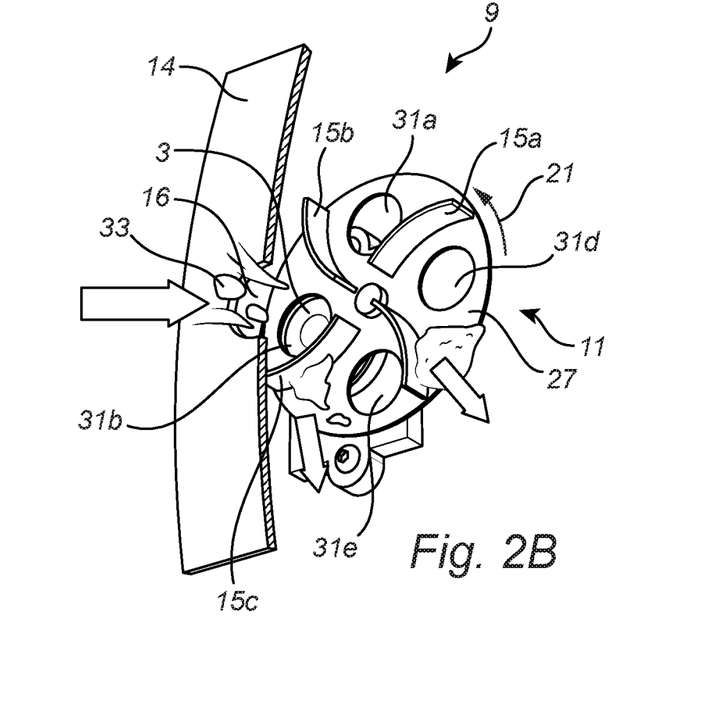
FIG. 2B schematically illustrates the sensing system in FIG. 2A in operation.

FIG. 2B schematically illustrates the sensing system 9 in FIG. 2A in operation. As shown in FIG. 2B, debris, such as drops 33 of water, may travel towards the sensor 3 and pass through the aperture 16 of the body panel 14. FIG. 2B schematically indicates that the drops 33 of water do not reach the sensor 3, but are caught by the moving blades 15a-d and thrown radially off the blades 15a-d and/or disc 27 by the centrifugal force created by the spinning disc 27 and blades 15a-d.

In particular, the provision of the blade or blades 15a-d having a relatively large aspect ratio (L/w), enables the blade or blades 15a-d to physically hit and deflect incoming debris, to thereby prevent the debris from reaching the sensor 3. By controlling the blade or blades 15a-d to move sufficiently fast, it can be provided for that no debris (water droplets, dirt, small stones etc) travels fast enough to reach the sensor 3. To that end, the actuator 17 may be controllable to move the blade or blades 15a-d at such a sufficiently high speed. As will be described further below with reference to FIG. 4, the control of the blade or blades 15a-d may depend on a speed of the vehicle.

Figure 3:
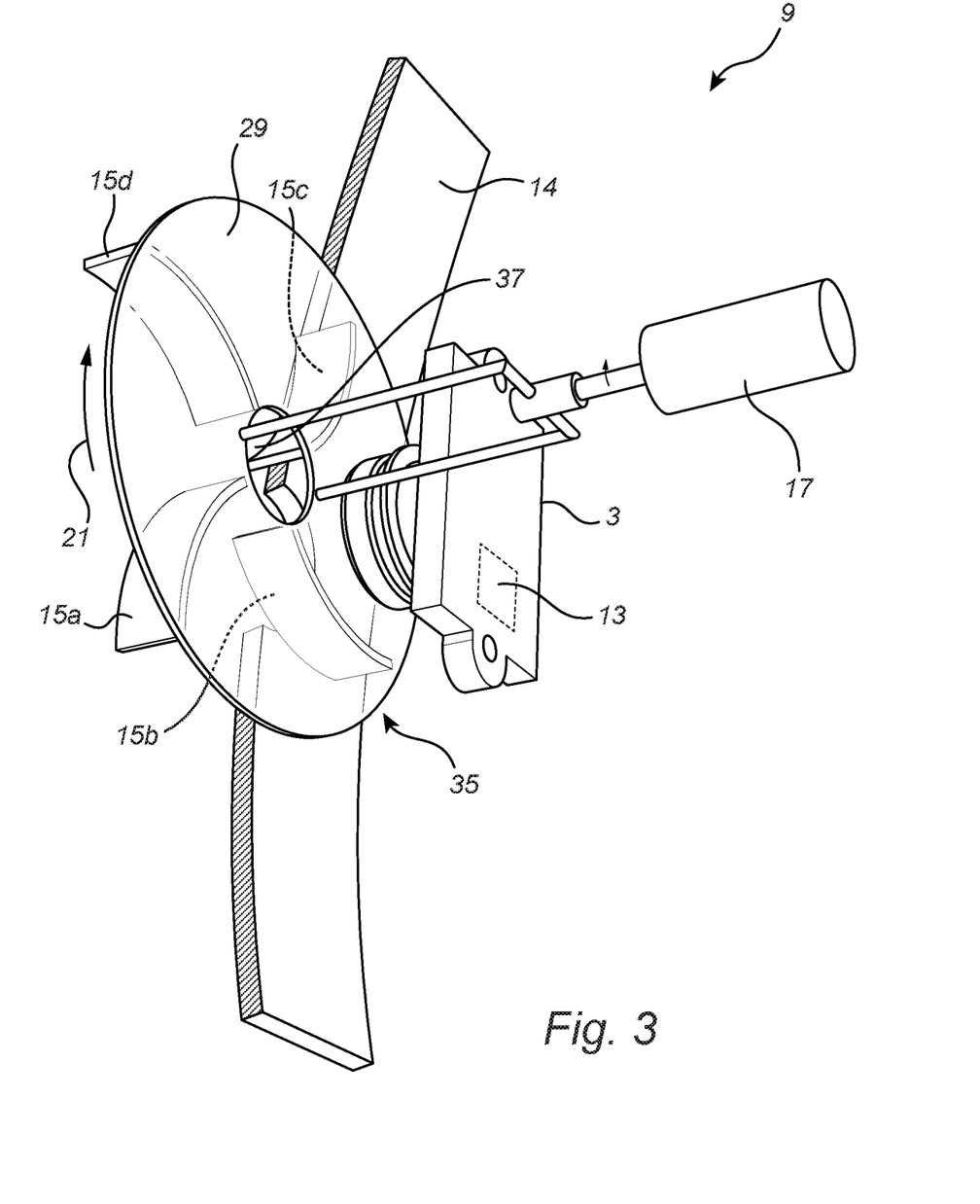
FIG. 3 schematically shows a sensing system comprising a sensor guard according to a second example embodiment of the present invention.

FIG. 3 schematically shows a sensing system 9 comprising a sensor guard 35 according to a second example embodiment of the present invention. The sensor guard 35 according to the second embodiment in FIG. 3 mainly differs from the sensor guard 11 according to the first embodiment in FIGS. 2A-B in that the disc 29 is transparent, lacks apertures in the line-of-sight of the sensor 3, and is provided with a centrally located hole 37, allowing for the formation of an airstream for slowing down debris etc traveling towards the sensor 3. With or without the centrally located hole 37, the transparent disc 29 serves to protect the sensor 3 from any debris that may be traveling too fast to be deflected by the moving blades 15a-d. In this and similar embodiments, with a protective transparent disc 29, the blade or blades 15a-d may be controlled to move with a lower speed, which may provide for a more silent or less energy-consuming sensor guard.

Figure 4:
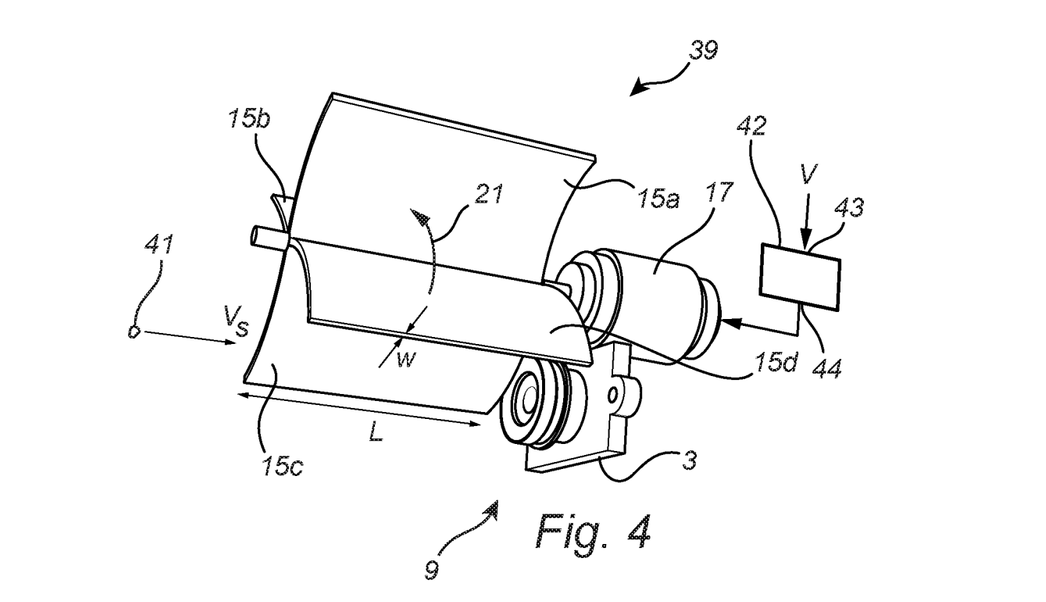
FIG. 4 schematically shows a sensing system comprising a sensor guard according to a third example embodiment of the present invention.

FIG. 4 schematically shows a sensing system 9 comprising a sensor guard 39 according to a third example embodiment of the present invention. As is evident from FIG. 4, the sensor guard 39 according to this third embodiment mainly differs from the previously described embodiments in that the sensor guard 39 in FIG. 4 lacks a disc and that the first extension L of the blades 15a-d is considerably longer. Since the sensor guard 39 in FIG. 4 lacks the protective disc 29 of the previously described sensor guard embodiments, the blades 15a-d should be dimensioned and moved by the actuator 17 to deflect incoming debris 41 traveling with a predefined velocity $v_s$ or less in relation to the vehicle 1. To achieve this, the actuator 17 may be controlled to move the blades sufficiently fast to fulfill the following relation:

$L \times S > v_s$, where

S is the number of sweeps through the line-of-sight 19 by a blade 15a-d per second. In the embodiments with blades rotating around a rotational axis, $S = R \times N$, where R is the number of revolutions per second, and N is the number of blades. According to embodiments, the above-mentioned predefined maximum debris velocity $v_s$ for which the sensor guard is dimensioned may be at least 10 meters per second.

According to this and other embodiments, the sensor guard 39 may comprise an actuator controller 42, having an input 43 for receiving a signal indicative of a speed v of the vehicle 1, and an output 44 for providing control signals to the actuator 17.

In embodiments, the actuator controller 42 may be configured to control the actuator 17 to move the blade or blades 15*a-d* sufficiently fast to fulfill the following relation:

$$L \times S > v, \text{ where}$$

L=the extension of the blade in the direction parallel to the line-of-sight when the blade sweeps through the line-of-sight;

S=the number of sweeps through the line-of-sight by a blade per second; and v=the speed of the vehicle.

Alternatively, the actuator controller 42 may be configured to control the actuator to move the blade or blades 15*a-d* faster, so that L×S is greater than the speed of the vehicle with some margin. The margin may be predefined, and may be constant, or depend on the vehicle speed, or may be determined in any other way. For example, the margin may be determined to account for a relative movement of the sensing system in relation to the vehicle.

In these embodiments, where the movement speed of the blade or blades 15*a-d* is slower when the vehicle 1 moves slower and faster when the vehicle 1 moves faster, the sensor guard 39 can be more silent and have a lower energy consumption when the vehicle 1 moves slower.

Figure 5:
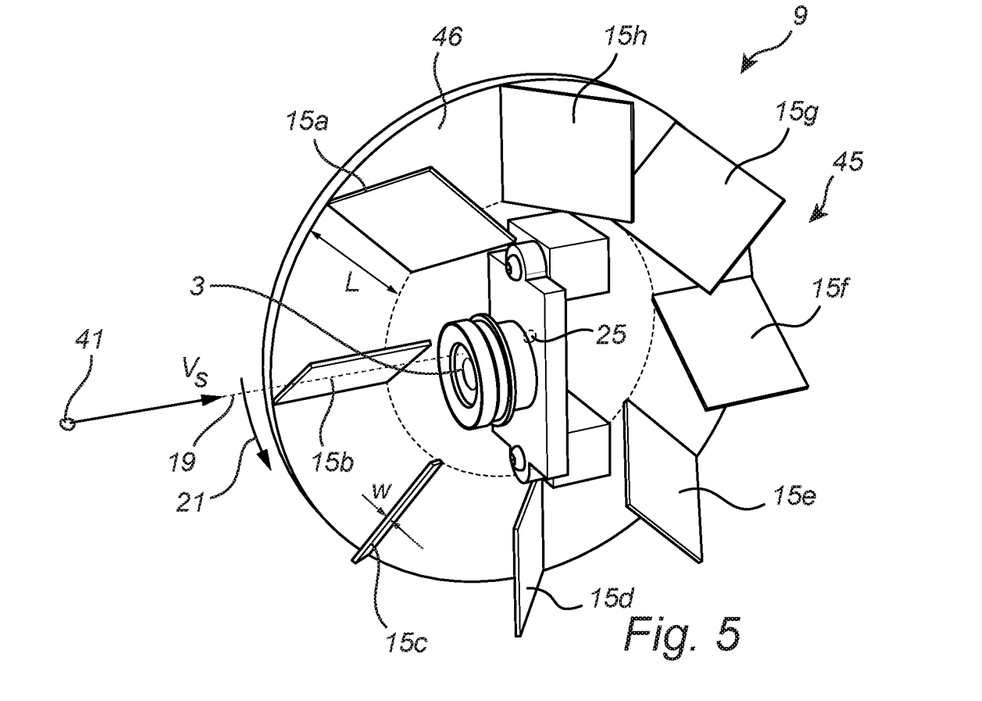
FIG. 5 schematically shows a sensing system comprising a sensor guard according to a fourth example embodiment of the present invention.

FIG. 5 schematically shows a sensing system 9 comprising a sensor guard 45 according to a fourth example embodiment of the present invention. In this fourth embodiment, the sensor guard is configured in such a way that the blades 15*a-h* are rotatable around a rotational axis 25 substantially perpendicular to the line-of-sight 19 of the sensor 3 when the sensor 3 is arranged to be protected by the sensor guard 45. As is schematically shown in FIG. 5, the blades 15*a-h* may be attached to a carrier 46, and the sensor 3 may be arranged "inside" or behind a space defined by the blades 15*a-h* and the carrier 46. In this embodiment, the blades 15*a-h* may advantageously be straight (not convex as in the previously described embodiments), and angled to the side to deflect debris 41 to the side.

Figure 6:
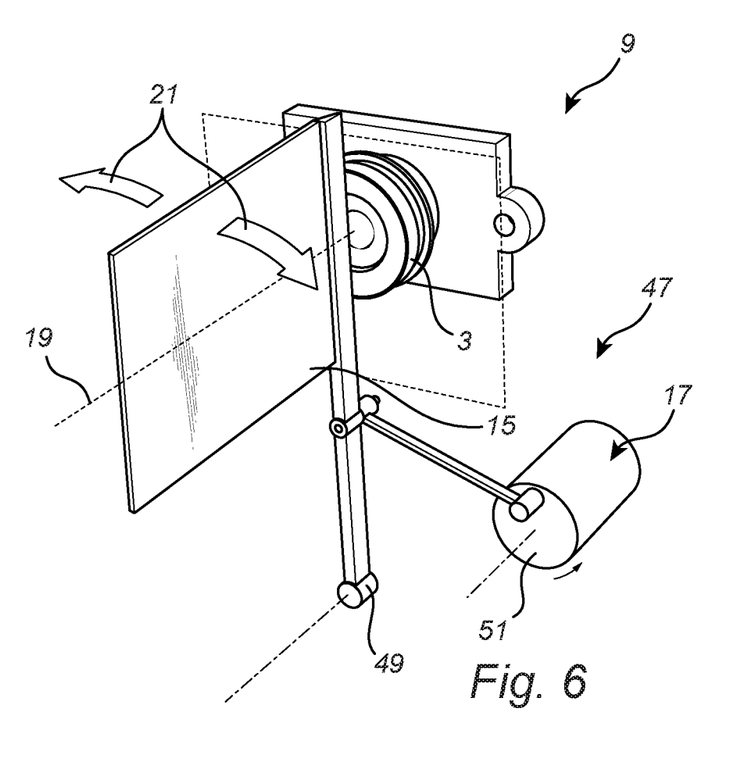
FIG. 6 schematically shows a sensing system comprising a sensor guard according to a fifth example embodiment of the present invention.

FIG. 6 schematically shows a sensing system 9 comprising a sensor guard 47 according to a fifth example embodiment of the present invention. As is schematically shown in FIG. 6, the sensor guard 47 according to this embodiment of the invention comprises a blade 15 arranged to pivot about a pivot axis 49 for the blade 15. Through an eccentric rotational coupling 51 between the actuator, here motor 17 and the blade 15, rotation of the motor 17 can be translated to pivoting motion of the blade 15, so that the blade 15 can be caused to move back and forth to sweep through the line-of-sight 19 of the sensor 3 in alternatingly opposite directions. This is indicated by the arrows 21 in FIG. 6. The sensor guard 47 in FIG. 6 may be provided with multiple blades. It should be noted that the blade 15 in FIG. 6 can be made to sweep through the line-of-sight 19 using several other actuators. For example, one or more electromagnets may be used to move a blade 15 of magnetic material back and forth in front of the sensor 3. For instance, the blade or blades may be made of spring steel.

The person skilled in the art realizes that the present invention by no means is limited to the preferred embodiments described above. On the contrary, many modifications and variations are possible within the scope of the appended claims. For example, the sensor guard may comprise a different number of blades. Furthermore, the actuator need not be an electric motor, but can be any other actuator capable of moving the blades as desired. In embodiments, the actuator may blow air or another compressed fluid onto the blade or blades to cause it or them to move.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A sensor guard, for protecting a sensor of a vehicle, where the sensor guard comprises a blade operable to sweep, under the control of an actuator, through a line-of-sight of the sensor when the sensor is arranged to be protected by the sensor guard, and where an extension of the blade in a direction parallel to the line-of-sight when the blade sweeps through the line-of sight is at least five times greater than an extension of the blade in a direction of movement of the blade when the blade sweeps through the line-of sight.

2. The sensor guard according to claim 1, where the sensor guard further comprises an actuator arranged and configured to move said blade to repeatedly sweep through the line-of-sight of said sensor when said sensor is arranged to be protected by said sensor guard.

3. The sensor guard according to claim 2, comprising an actuator controller configured to control said actuator to move said blade sufficiently fast to fulfill the following relation:

$$L \times S > 10 \text{ m/s, where}$$

L=the extension of said blade in the direction parallel to the line-of-sight when said blade sweeps through the line-of sight; and S=the number of sweeps through the line-of-sight by a blade per second.

4. The sensor guard according to claim 2, further comprising an actuator controller having an input for receiving a signal indicative of a speed of said vehicle, said actuator being configured to control said actuator to move said blade sufficiently fast to fulfill the following relation:

$$L \times S > v_s, \text{ where}$$

L=the extension of said blade in the direction parallel to the line-of-sight when said blade sweeps through the line-of sight;

S=the number of sweeps through the line-of-sight by a blade per second; and $v_s$=the speed of the vehicle.

5. The sensor guard according to claim 1, where the sensor guard includes a plurality of blades operable to sweep, under the control of the actuator, to sweep through the line-of-sight of said sensor in succession when said sensor is arranged to be protected by said sensor guard.

6. The sensor guard according to claim 1, wherein said blade is rotatable around a rotational axis substantially parallel to the line-of-sight of said sensor when said sensor is arranged to be protected by said sensor guard.

7. The sensor guard according to claim 6, wherein said sensor guard further comprises a disc arranged between said blade and said sensor when said sensor is arranged to be protected by said sensor guard.

8. The sensor guard according to claim 7, wherein said disc is joined to said blade, to rotate around said rotational axis together with said blade.

9. The sensor guard according to claim 1, wherein said blade is rotatable around a rotational axis substantially perpendicular to the line-of-sight of said sensor when said sensor is arranged to be protected by said sensor guard.

10. The sensor guard according to claim 2, wherein said actuator is arranged and configured to move said blade back and forth to sweep through the line-of-sight of said sensor in alternatingly opposite directions.

11. A sensing system comprising:
a sensor;
the sensor guard according to claim 1, arranged to protect said sensor; and
a sensing system controller configured to control operation of said sensor.

12. The sensing system according to claim 11, wherein the blade of the sensor guard is operable to sweep through the line-of-sight of the sensor under the control of said sensing system controller.

13. A vehicle, comprising the sensing system according to claim 11.

14. A method of protecting a sensor of a vehicle using a sensor guard comprising at least one blade and an actuator arranged and configured to move said at least one blade to sweep through the line-of-sight of said sensor, said method comprising the steps of:
acquiring a signal indicative of a speed of said vehicle; and
controlling said actuator to move said at least one blade sufficiently fast to fulfill the following relation:

$L \times S > v_s$, where

L=the extension of said blade in the direction parallel to the line-of-sight when said blade sweeps through the line-of sight;
S=the number of sweeps through the line-of-sight by a blade per second; and
$v_s$=the speed of the vehicle.

* * * * *